US008027870B2

(12) United States Patent
Ray et al.

(10) Patent No.: US 8,027,870 B2
(45) Date of Patent: Sep. 27, 2011

(54) METHOD AND APPARATUS FOR FORMALIZING INFORMATION TECHNOLOGY (IT) BUSINESS DECISION MAKING

(75) Inventors: Bonnie K. Ray, Nyack, NY (US); Mary E. Helander, North White Plains, NY (US); Richard C. Henderson, Germantown, TN (US)

(73) Assignee: International Business Machines Corporation, Armonk, NY (US)

( * ) Notice: Subject to any disclaimer, the term of this patent is extended or adjusted under 35 U.S.C. 154(b) by 1303 days.

(21) Appl. No.: 11/619,566

(22) Filed: Jan. 3, 2007

(65) Prior Publication Data
US 2008/0162392 A1  Jul. 3, 2008

(51) Int. Cl.
*G06Q 10/00* (2006.01)
(52) U.S. Cl. .................................. 705/7.39; 705/7.38
(58) Field of Classification Search .............. 705/7.38, 705/7.39
See application file for complete search history.

(56) References Cited

U.S. PATENT DOCUMENTS

| 6,097,886 | A  | * | 8/2000 | Dave et al. ..................... | 703/23 |
| 7,739,099 | B2 | * | 6/2010 | Liu et al. ........................ | 703/22 |
| 7,805,496 | B2 | * | 9/2010 | Aiber et al. .................... | 709/217 |
| 2005/0137920 | A1 | * | 6/2005 | O'Connor et al. .............. | 705/7 |
| 2008/0126163 | A1 | * | 5/2008 | Hogan et al. .................... | 705/8 |

OTHER PUBLICATIONS

Chen et al., Managing Server Energy and Operational Costs in Hosting Centers, SIGMETRICS'05, Banff, Alberta, Canada, Jun. 6-10, 2005, p. 303-14.*
April et al., Optfolio—A Simulation Optimization System for Project Portfolio Planning, Proceedings of the 2003 Winter Simulation Conference, p. 301-09.*
Aerts et al., Accounting for Spatial Uncertainty in Optimization with Spatial Decision Support Systems, Transactions in GIS, col. 7, No. 2, 2003, p. 211-30.*
Tan et al., Heuristic-Based Model Refinement for FLAVERS, 2004, p. 1-10.*
Scholtz and Consolvo, Toward a Framework for Evaluating Ubiquitous Computing Applications, Pervasive Computing, Applications, Apr.-Jun. 2004, p. 82-88.*

* cited by examiner

*Primary Examiner* — R. David Rines
(74) *Attorney, Agent, or Firm* — McGinn Intellecutal Property Law Group, PLLC (57) ABSTRACT

A method, framework, and system for providing formalized Information Technology (IT) business decision making, which includes determining a relationship between at least one Information Technology (IT) environmental element and at least one Information Technology (IT) performance metric, and determining a business value based on the at least one Information Technology (IT) environmental element and the at least one Information Technology (IT) performance metric to optimize an Information Technology (IT) business decision based on at least one predetermined business objective. The at least one predetermined business objective is based on a set of system constraints.

10 Claims, 4 Drawing Sheets

METHOD AND APPARATUS FOR FORMALIZING INFORMATION TECHNOLOGY (IT) BUSINESS DECISION MAKING

BACKGROUND OF THE INVENTION

1. Field of the Invention

The present invention generally relates to a method, framework, and system for determining a significant relationship between at least one Information Technology (IT) environmental element and at least one Information Technology (IT) performance metric (e.g., efficiency, productivity), and determining a business value based on the at least one IT environmental element and the at least one IT performance metric to optimize a formalized IT business decision based on a set of business objectives, subject to a set of system constraints.

2. Description of the Conventional Art

The conventional methods and systems for IT business decision making do not provide a formal and repeatable process for 1) characterizing relationships between IT environmental elements and IT performance metrics and 2) determining values of IT environmental elements to optimize IT performance metrics and IT business decision-making in light of business objectives subject to business and system constraints. Instead, the conventional methods generally rely on subjective judgments and expert opinions. The conventional methods and systems do not address or recognize the problems associated with Information Technology (IT) business decision making, or for that matter, any relationships between IT environmental elements and IT performance metrics.

SUMMARY OF THE INVENTION

In view of the foregoing and other exemplary problems, drawbacks, and disadvantages of the related art methods and structures, an exemplary feature of the present invention is to provide a method, framework, and system for determining a significant relationship between at least one IT environmental element (e.g. servers, applications, storage systems, etc.) and at least one IT performance metric (e.g., efficiency, productivity), and determining a business value based on the at least one IT environmental element and the at least one IT performance metric to optimize a formalized IT business decision based on a set of business objectives, subject to a set of system constraints.

For purposes of the present invention, the term "Information Technologies (IT)" generally refers to the use of technology in managing and processing information (e.g., in large organizations). In particular, IT generally deals with the use of electronic computers and computer software to convert, store, protect, process, transmit, and retrieve information. For that reason, computer professionals are often called IT specialists or Business Process Consultants, and the division of a company or university that deals with software technology is often called the IT department. Other names for the latter are information services (IS) or management information services (MIS), managed service providers (MSP).

The present invention provides a formal and repeatable process for characterizing relationships between IT environmental elements and IT performance metrics and determining values of IT environmental elements to optimize IT performance metrics and IT business decision making in light of business objectives subject to business and system constraints.

The ordinarily skilled artisan would recognize that the present invention is applicable to other IT metrics besides efficiency (e.g., robustness of IT environment, enhancement of employee productivity (IT effectiveness). Examples of business objectives can include, but are not limited to, revenue growth of a specified amount, achieving customer service level agreements, etc. Examples of system constraints can include, but are not limited to, IT cost, IT total budget, etc.

More particularly, an exemplary feature of the present invention can provide companies with the important advantage of enhancing the IT decision making process through a formalized method of assessing impact of different decisions on customized IT efficiency objectives, subject to constraints.

The exemplary aspects of the invention can be provided as a consulting service, for example, to drive sales in server consolidation, application rationalization, business process outsourcing, etc.

In one exemplary aspect of the invention, a method of providing formalized Information Technology (IT) business decision making can include determining a relationship between at least one Information Technology (IT) environmental element and at least one Information Technology (IT) performance metric, and determining a business value based on the at least one Information Technology (IT) environmental element and the at least one Information Technology (IT) performance metric to optimize an Information Technology (IT) business decision based on a set of predetermined business objectives, wherein the predetermined business objectives are based on a set of system constraints.

In another exemplary aspect of the invention, a method of optimizing an Information Technology (IT) decision making process is provided, in which the method includes assessing impact of different decisions on at least one customized Information Technology (IT) metric objective, subject to a set of constraints.

Yet another exemplary aspect of the invention is directed to a computer-readable medium tangibly embodying a program of recordable, machine-readable instructions executable by a digital processing apparatus to perform the exemplary method of providing formalized Information Technology (IT) business decision making, according to the present invention.

Another exemplary aspect of the invention is directed to a method for deploying computing infrastructure in which computer-readable code is integrated into a computing system, and combines with said computing system to perform the method of providing formalized Information Technology (IT) business decision making, according to the present invention.

BRIEF DESCRIPTION OF THE DRAWINGS

The foregoing and other exemplary purposes, aspects and advantages will be better understood from the following detailed description of an exemplary aspects of the invention with reference to the drawings, in which.

DETAILED DESCRIPTION OF EXEMPLARY ASPECTS OF THE INVENTION

Referring now to the drawings, and more particularly to FIGS. 1-5, there are shown exemplary aspects of the method and structures according to the present invention.

The present invention generally relates to a method and system for determining a significant relationship between at least one IT environmental element and at least one IT performance metric, and determining a business value based on the at least one IT environmental element and the at least one IT performance metric to optimize an IT business decision based on a set of business objectives, subject to a set of system constraints.

The ordinarily skilled artisan would recognize that the present invention can include IT metrics besides efficiency, robustness of IT environment, enhancement of employee productivity (IT effectiveness). Examples of business objectives can include, but are not limited to, revenue growth of a specified amount, achieving customer service level agreements, etc. Examples of system constraints can include, but are not limited to, IT cost, IT total budget, etc.

Figure 1:
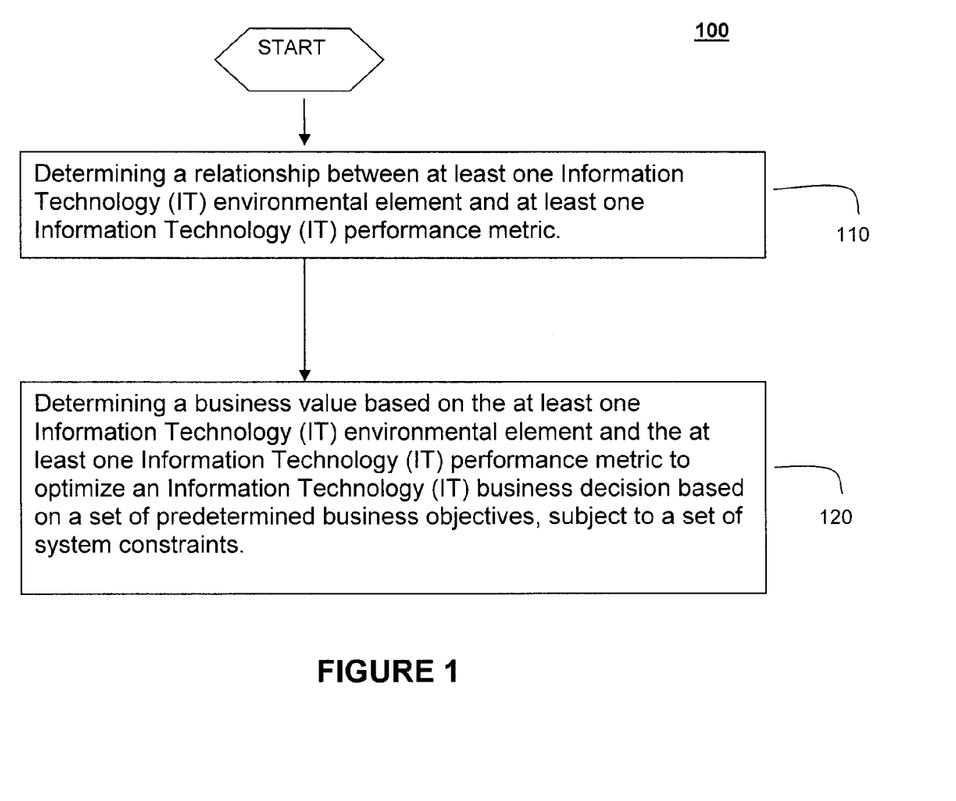
FIG. 1 illustrates an exemplary method 100, according to an exemplary, nonlimiting aspect of the present invention.

With reference to FIG. 1, the exemplary method 100 of providing formalized Information Technology (IT) business decision making, can include a step of determining a relationship between at least one Information Technology (IT) environmental element and at least one Information Technology (IT) performance metric (e.g., 110) and a step of determining a business value based on the at least one Information Technology (IT) environmental element and the at least one Information Technology (IT) performance metric to optimize an Information Technology (IT) business decision based on a set of predetermined business objectives (e.g., 120), wherein the predetermined business objectives are based on a set of system constraints.

Figure 2:
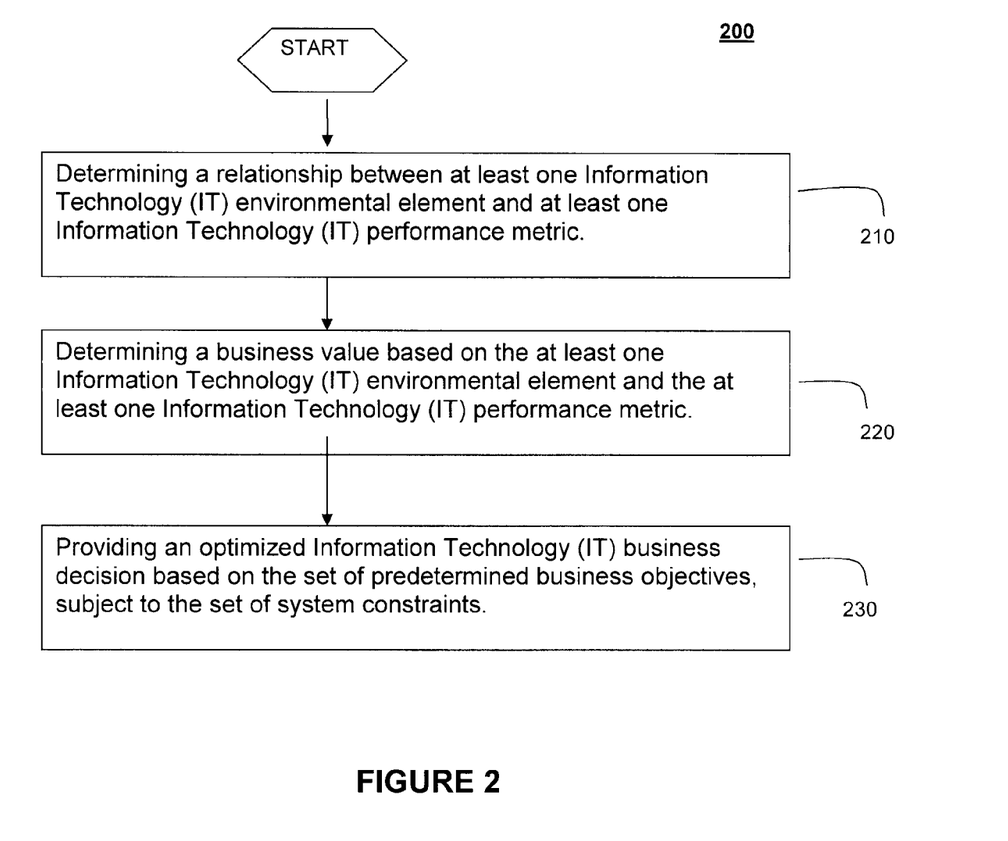
FIG. 2 illustrates an exemplary method 200, according to an exemplary, nonlimiting aspect of the present invention.

With reference to FIG. 2, the exemplary method 200 of optimizing an Information Technology (IT) decision making process, includes determining a relationship between at least one Information Technology (IT) environmental element and at least one Information Technology (IT) performance metric (e.g., 210), determining a business value based on the at least one Information Technology (IT) environmental element and the at least one Information Technology (IT) performance metric (e.g., 220), and providing an optimized Information Technology (IT) business decision based on a set of predetermined business objectives (e.g., 230), wherein the predetermined business objectives are based on a set of system constraints.

Figure 3:
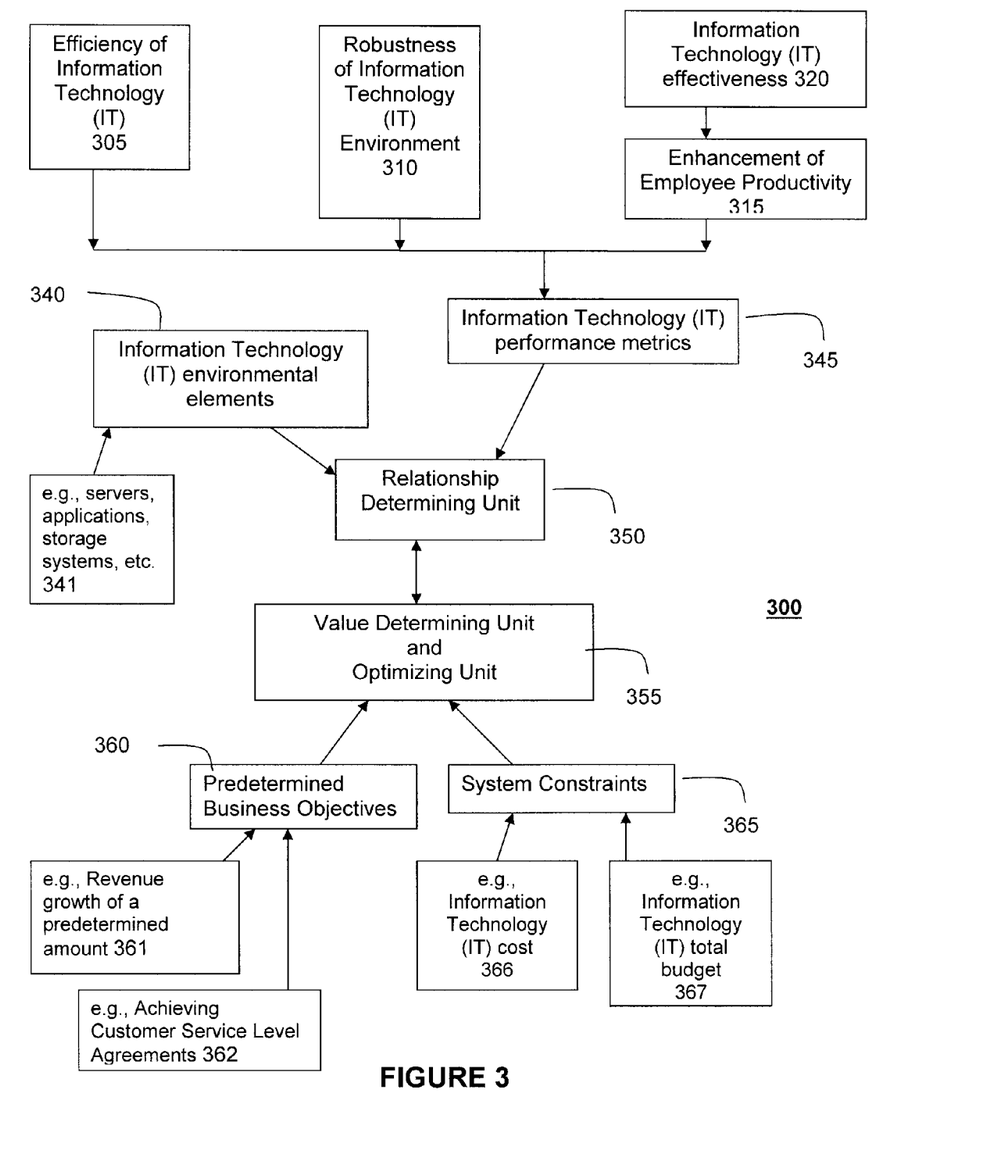
FIG. 3 illustrates an exemplary system 300, according to an exemplary, nonlimiting aspect of the present invention.

With reference to FIG. 3, the exemplary system 300 for providing formalized Information Technology (IT) business decision making, includes a first determining unit (e.g., 350) that determines relationships between Information Technology (IT) environmental elements (e.g., 340) and Information Technology (IT) metrics (e.g., 345).

A second determining unit and optimizing unit (e.g., 355) can determine business values based on at least one of the Information Technology (IT) environmental elements and at least one of the Information Technology (IT) performance metrics to optimize an Information Technology (IT) business decision based on a set of predetermined business objectives (e.g., 360), subject to a set of system constraints (e.g., 365).

As exemplarily illustrated in FIG. 3, the Information Technology (IT) metrics (e.g., 345) can include, among other things, at least one of efficiency (e.g., 305), robustness of the Information Technology (IT) environment (e.g., 310), and enhancement of employee productivity (e.g., 315)(e.g., Information Technology (IT) effectiveness 320)). Referring again to the exemplarily aspects illustrated in FIG. 3, the Information Technology (IT) environmental elements (e.g., 340) can include, among other things, at least one of servers, applications, storage systems, etc. (e.g., 341)).

The exemplary business objectives can include, among other things, revenue growth of a specified amount (e.g., 361), achieving customer service level agreements (e.g., 362), etc. The exemplary system constraints can include, among other things, IT cost (e.g., 366), IT total budget (e.g., 367), etc.

An exemplary aspect of the invention will be described below with respect to the probabilistic attainment of IT efficiency with total cost minimization, according to an exemplary aspect of the present invention. The present invention generally is described below with reference to an example of a linear relationship between IT environmental elements and IT performance metrics. However, the ordinarily skilled artisan will recognize that the present invention is generalizable to any form of relationship, subject to random error. Thus, while the invention has been described in terms of several exemplary aspects, those skilled in the art will recognize that the invention can be practiced with modification within the spirit and scope of the appended claims. Further, it is noted that, Applicants' intent is to encompass equivalents of all claim elements, even if amended later during prosecution.

The exemplary aspects of the present invention can minimize total cost of achieving IT efficiency target, for example, as a function of IT environmental elements $x_1 \ldots, x_n$.

According to the present invention, constraints insure that measurements related to efficiency are achieved within acceptable and feasible ranges. For example:

Minimize $C(x_1, \ldots, x_n)$

Subject to: $\Pr\{\ell_j \leq Y_j \leq \mu_j\} \geq \psi_j$, for $j=1, \ldots, m$ $lb_i < x_i < ub_i$, $i=1, \ldots, n$, where $C(x_1, \ldots, x_n)$ denotes the IT cost as a function of IT elements $x_1, \ldots, x_n$, $Y_j = G(x_1, \ldots, x_n, \epsilon_j)$ denotes IT efficiency metric, and $G(.)$ denotes the relationship between IT efficiency and IT element, subject to a random error, $\epsilon_j$.

An alternative form can maximize the probability of a target IT efficiency attainment, constrained by an IT budget.

According the exemplary features of the present invention, the case of a linear relationship between IT environment variables and IT efficiency can be described as follows:

Let j follow a linear model of the form:

$$Y_j = b_{0,j} + \sum_{i=1}^{3} \beta_{i,j} x_i + \varepsilon_j = G_j(x_1, \ldots, x_n) + \varepsilon_j,$$

where $\epsilon_j$ is $N(0, \sigma_{\epsilon j})$. Then $Y_j$ is $N(G_j(x_1, \ldots, x_n), \sigma_{\epsilon j})$.

The values $x_1, \ldots, x_n$ can be such that the area between each $\ell_j$ and $\mu_j$ under the Normal curve with mean 0 and variance $\sigma_{\epsilon j}$ is at least $\psi_j$, and hence, cost is minimized.

Another exemplary formulation according to the present invention will now be described below:

Let: $x_1$=number of servers, $x_2$=number of applications, $x_3$=number of storage systems Let $Y_1$=number of server administrators,
$Y_2$=IT Op budget/employee,
$Y_3$=IT Op budget/total revenue
Assume:

$$Y_j = \sum_{i=1}^{3} \beta_{i,j} x_i + \varepsilon_j,$$

Where $\beta_{i,j}$ can equal zero in some cases.

$$C(x_1, x_2, x_3) = \sum_{i=1}^{3} C_i(x_i)$$

Let:
With: $C_i(x_i) = a_i + b_i x_i$

It is noted that the ordinarily skilled artisan would recognize that more complex cost functions reflecting total cost of ownership can be provided, e.g., nonlinear or non-additive, according to the present invention.

An exemplary solution according to the present invention will be described below.

For purposes of this exemplary solution, a 3-d rectangle (formed by the 8 points defined by the upper and lower bounds of $x_1, x_2, x_3$) is considered (e.g., imagined).

Next, the method includes superimposing on the 3-d rectangle some slices (e.g., six (6) slices in all with pairs that are "parallel in 3d space" which define walls.

As a result, the slices form an odd shape polygon with flat sides, by snipping away parts of the 3d rectangle.

Next, the method can consider (e.g., imagine) this shape with "fuzzy" lines (e.g., the effect of the error term being an RV) with the variances=0. As a result, a well defined line is obtained. According to this exemplary solution, one of the corner points will be the optimal solution.

According to another exemplary solution, in the stochastic case, a probability distribution in $(x_1, x_2, x_3)$ can be obtained where the objective function trajectory last exits the polygon.

According to an exemplary aspect of the present invention, the problems with the conventional methods and systems can be solved, for example, by incorporating uncertainty concerning the relationship between IT environmental elements and IT efficiency metrics through, for example, a random error component:

$$Y_j = G(x_1, \ldots, x_n) + \epsilon_j$$

The present invention also can provide application of stochastic optimization within a new domain.

According to the exemplary aspects of the present invention, a model refinement process can be used to customize the method for a particular client environment (e.g., client specific relationships based on, for example, client industry, client size, cost function specification, etc.).

As described above, the ordinarily skilled artisan would recognize that the present invention is applicable to IT metrics such as, for example, IT efficiency, robustness of IT environment, enhancement of employee productivity (IT effectiveness), IT cost, IT total budget, etc.

An exemplary IT Efficiency Model according to the present invention will now be described below.

1.1 General Notation
n≡Number of decision variables
$x_i$≡Decision variable i, for i=1; 2; ...; n C≡Cost function, with parameters $x_1, x_2, \ldots, x_n$
T≡The budget maximum
$G_A$≡A function derived from regression analysis, that maps $x_1, x_2, \ldots, x_n$ as independent variables to "A," the number of administrators, plus an error term $\epsilon_A$. Of the form:

$$G_A(x_1, x_2, \ldots, x_n) = a + b_1 x_1 + b_2 x_2 + \ldots + b_n x_n + \epsilon_A$$

where a; $b_1$; $b_2$; ...; $b_n$ are constants and $\epsilon_A$ is a random variable error term with mean $\hat{\epsilon}_A$ and variance $\sigma_A$.

$G_E$≡A function derived from regression analysis, that maps $x_1, x_2, \ldots, x_n$ as independent variables to "E," the IT cost per employee, plus an error term $\epsilon A$. Of the form $$G_E(x_1 + x_2 + \ldots + x_n) = \dot{a} + \dot{b}_1 x_1 + \dot{b}_2 x_2 + \ldots + \dot{b}_n x_n + \epsilon_E$$

where a, $\dot{b}_1, \dot{b}_2, \ldots \dot{b}_n$ are constants and $\epsilon_E$ is a random variable error term with mean $\hat{\epsilon}_E$ and variance $\sigma_E$.

$G_R$≡A function derived from regression analysis, that maps $x_1, x_2, \ldots, x_n$ as independent variables to "R," the IT spend as a percentage of revenue, plus an error term $\epsilon_A$. Of the form:

$$G_R(x_1 + x_2 + \ldots + x_n) = \ddot{a} + \ddot{b}_{l1} x_1 + \ddot{b}_{l2} x_2 + \ldots + \ddot{b}_{ln} x_n + \epsilon_R$$

where a, $\ddot{b}_{l1}, \ddot{b}_{l2}, \ddot{b}_{ln}$ are constants and $\epsilon_R$ is a random variable error term with mean $\hat{\epsilon}_R$ and variance $\sigma_R$.

$\psi_A; \psi_E; \psi_R$≡Desired minimum probability of achieving $G_A, G_E$ and $G_R$ within their bounded intervals, respectively.

$\ell_{iA}; \ell_{iE}; \ell_{iR}$≡Desired lower bounds on $G_A, G_E$ and $G_R$ respectively.

$\mu_A, \mu_E, \mu_R$≡Desired upper bounds on $G_A, G_E$ and $G_R$ respectively.

$lb_i$≡Lower bound value for decision variable i, for i=1; 2, ..., n $ub_i$≡Upper bound value for decision variable i, for i=1; 2, ..., n $\alpha_A, \alpha_E, \alpha_R$≡Desired lower bounds on the expected value of $G_A, G_E$ and $G_R$ respectively.

$\beta_A, \beta_E, \beta_R$≡Desired upper bounds on the expected value of $G_A, G_E$ and $G_R$ respectively.

1.2 Minimizing Cost, While Achieving IT Efficiency Targets 1.2.1 Probability-Based Constraint Version The following exemplary model seeks to minimize total cost of achieving IT efficiency, as a function of the parameters $x_1, x_2, \ldots, x_n$. The exemplary constraints can insure that measurements related to efficiency are achieved within acceptable and feasible ranges.

Minimize $C(x_1, x_2, \ldots, x_n)$  (1)

Subject to: $Pr\{\ell_{iA} \leq G_A(x_1, x_2, \ldots, x_n) \leq \mu_A\} \geq \psi_A$  (2)

$Pr\{\ell_{iE} \leq G_E(x_1, x_2, \ldots, x_n) \leq \mu_E\} \geq \psi_E$  (3)

$Pr\{\ell_{iR} \leq G_R(x_1, x_2, \ldots, x_n) \leq \mu_R\} \geq \psi_R$  (4)

$lb_i \leq x_i \leq ub_i$ for i=1; ...; n  (5)

The following description takes a closer look at exemplary constraints 2, 3, and 4.

Since they are all of the same form, the A, E and R subscript will be omitted for the purpose of generalization.

The function:

$$G(x_1, x_2, \ldots, x_n) = a + b_1 x_1 + b_2 x_2 + \ldots + b_n x_n + \epsilon \quad (6)$$

is fitted by way of linear regression analysis, where $x_1, x_2, \ldots, x_n$ are the dependent variables, a is a fitted constant, b1; b2; : : : ; bn are the fitted linear coefficients, and $\epsilon$ is the error term. (It is noted that that some of the $x_i$'s may be insignificant, i.e. when $b_i$ is zero). The only random variable in 6 is $\epsilon$, which we will assume is normally distributed with mean $\bar{\epsilon}$ and variance $\sigma^2$.

In other words, $\epsilon \sim N(\bar{\epsilon}, \sigma^2)$. This means that $G(x_1, x_2, \ldots, x_n)$ is a normally distributed random variable as well, with a mean of $\bar{\epsilon}$ offset by $(a+b_1x_1+b_2x_2+\ldots+b_nx_n)$ and the same variance $\sigma 2$.

That is, $$G(x_1+x_2+\ldots+x_n) \sim N(\bar{\epsilon}+(a+b_1x_1+b_2x_2+\ldots+b_nx_n), \sigma^2) \quad (7)$$

Assuming 7, the constraints 2, 3 and 4 may be rewritten using the probability density function for the normal distribution:

$$Pr\{\ell \leq G(x_1, x_2, \ldots, x_n) \leq \cdot \mu\} \geq \psi \Rightarrow \quad (8)$$

$$\int_\ell^\mu \frac{y}{\sqrt{2\pi\sigma^2}} e^{-(y-(\bar{\epsilon}+(a+b_1x_1+b_2x_2+\ldots+b_nx_n)))/2\sigma^2} dy \geq \psi$$

Constraint 7 says "find values of $x_1, x_2, \ldots, x_n$ so that the area, between l and $\mu$ under the Normal curve, with mean $\bar{\epsilon}+(a+b_1x_1+b_2x_2+\ldots+b_nx_n)$ and variance $\sigma^2$ is at least $\psi$."

1.2.2 Expected Value Constraint Version

An alternative to constraining based on the probability limits given in 2, 3, and 4 is to require the expected values of corresponding random variables to be constrained. This is achieved, for example, by replacing 2, 3, and 4 with respectively:

$$\alpha_A \leq E[G_A(x_1, x_2, \ldots, x_n)] \leq \beta_A \quad (9)$$

$$\alpha_E \leq E[G_E(x_1, x_2, \ldots, x_n)] \leq \beta_E \quad (10)$$

$$\alpha_R \leq E[G_R(x_1, x_2, \ldots, x_n)] \leq \beta_R \quad (11)$$

Under the assumption of normally distributed error terms, 9, 10 and 11 become:

$$\alpha_A \leq \bar{\epsilon}_A + (a+b_1x_1+b_2x_2+\ldots+b_nx_n) \leq \beta_A \quad (12)$$

$$\alpha_E \leq \bar{\epsilon}_E + (\dot{a}+\dot{b}_1x_1+\dot{b}_2x_2+\ldots+\dot{b}_nx_n) \leq \beta_E \quad (13)$$

$$\alpha_R \leq \bar{\epsilon}_R (\ddot{a}+\ddot{b}_{1_1}x_1+\ddot{b}_{1_2}x_2+\ldots+\ddot{b}_{1_r}x_n) \leq \beta_R \quad (14)$$

as well as:

$$(a+b_1x_1+b_2x_2+\ldots+b_nx_n) \geq \alpha_A - \bar{\epsilon}_A - a \quad (15)$$

$$-(a+b_1x_1+b_2x_2+\ldots+b_nx_n) \geq -\beta_A + \bar{\epsilon}_A + a \quad (16)$$

$$(\dot{a}+\dot{b}_1x_1+\dot{b}_2x_2+\ldots+\dot{b}_nx_n) \geq \alpha_E - \bar{\epsilon}_E - \dot{a} \quad (17)$$

$$-(\dot{a}+\dot{b}_1x_1+\dot{b}_2x_2+\ldots+\dot{b}_nx_n) \geq -\beta_E + \bar{\epsilon}_E + \dot{a} \quad (18)$$

$$(\ddot{a}+\ddot{b}_{1_1}x_1+\ddot{b}_{1_2}x_2+\ldots+\ddot{b}_{1_r}x_n) \geq \alpha_R - \bar{\epsilon}_R - \ddot{a} \quad (19)$$

$$-(\ddot{a}+\ddot{b}_{1_1}x_1+\ddot{b}_{1_2}x_2+\ldots+\ddot{b}_{1_r}x_n) \geq \beta_R + \bar{\epsilon}_R + \ddot{a} \quad (20)$$

1.3 Maximizing IT Efficiency within a Budget

Maximize $$Pr\{\text{Event } A \cap \text{Event } E \cap \text{Event } R\} \quad (21)$$

Subject to:

$$C(x_1, x_2, \ldots, x_n) \leq T \quad (22)$$

$$lb_i \leq x_i \leq ub_i \text{ for } i=1; \ldots; n \quad (23)$$

where:
Event $A \equiv (\ell_{i_A} \leq \cdot G_A(x_1, x_2, \ldots, x_n) \leq \cdot \mu_A)$,
Event $E \equiv (\ell_{i_E} \leq \cdot G_E(x_1, x_2, \ldots, x_n) \leq \cdot \mu_E)$, and
Event $R \equiv (\ell_{i_R} \leq \cdot G_R(x_1, x_2, \ldots, x_n) \leq \cdot \mu_R)$.

The exemplary aspects of the present invention can provide companies with the important advantage of enhancing the IT decision making process through a formalized method of assessing impact of different decisions on customized IT efficiency objectives, subject to constraints.

The exemplary aspects of the invention can be provided as a consulting service, for example, to drive sales in server consolidation, application rationalization, etc. (which can be analogous to the use of a Business Value Modeling Tool).

Figures 4, 5:
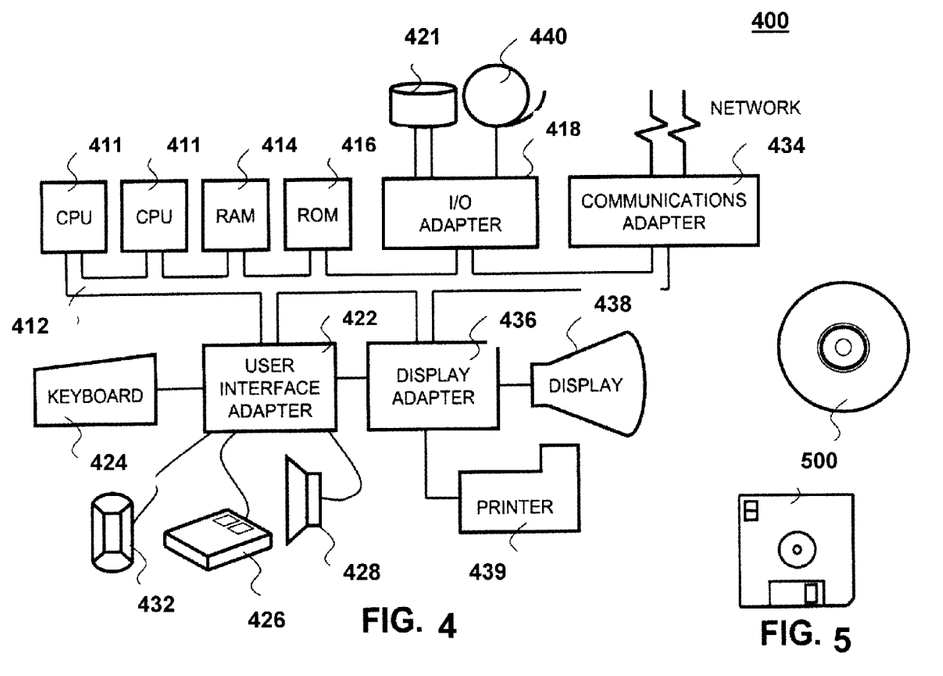
FIG. 4 illustrates an exemplary hardware/information handling system 400 for incorporating the present invention therein.
FIG. 5 illustrates a computer readable (or signal bearing) medium (e.g., storage medium 500) for storing/recording steps of a program of a method according to the present invention.

FIG. 4 illustrates an exemplary hardware/information handling system 400 for incorporating the present invention therein, and FIG. 5 illustrates an exemplary computer-readable medium 500 (e.g., signal-bearing medium, storage medium, etc.) for storing steps of a program of a method according to the present invention.

FIG. 4 exemplarily illustrates a typical hardware configuration of an information handling/computer system for use with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 512), a communication adapter 534 for connecting an information handling system to a data processing network, the Internet, an Intranet, a personal area network (PAN), etc., and a display adapter 436 for connecting the bus 412 to a display device 438 and/or printer 439.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media or computer-readable media.

This computer-readable media or signal-bearing media may include, for example, a RAM contained within the CPU 411, as represented by the fast-access storage for example. Alternatively, the instructions may be contained in another computer-readable media or signal-bearing media, such as a data storage disk/diskette 500 (FIG. 5), directly or indirectly accessible by the CPU 411.

Whether contained in the disk/diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable computer-readable media or signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary aspects, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of providing formalized Information Technology (IT) business decision making, the method comprising:
    determining, on a processor of a computer, a relationship between at least one Information Technology (IT) environmental element and at least two Information Technology (IT) performance metrics;
    determining a business value based on said relationship between said at least one Information Technology (IT) environmental element and said at least two Information Technology (IT) performance metrics to optimize an Information Technology (IT) business decision based on at least one predetermined business objective,
    wherein said at least one predetermined business objective is based on a set of system constraints, and
    wherein said at least two Information Technology (IT) performance metrics are selected from the group consisting of efficiency, robustness of Information Technology (IT) environment, enhancement of employee productivity, and Information Technology (IT) effectiveness; and
    optimizing on the processor of the computer, based on said at least one predetermined business objective, said Information Technology (IT) business decision using said business value, wherein said optimizing incorporates uncertainty concerning the relationship between said at least one Information Technology (IT) environmental element and said at least two Information Technology (IT) performance metrics through a random error component,
    wherein said random error component enters the relationship as:

$$Y_j = G(x_1, \ldots, x_n) + \epsilon_j$$

wherein G represents a relationship between one of said at least two Information Technology IT performance metrics and one of said at least one Information Technology IT environmental element and x represents a decision variable, and
    wherein optimizing said Information Technology (IT) business decision comprises stochastic optimization.

2. The method according to claim 1, wherein one of said at least two Information Technology (IT) performance metrics comprises efficiency, and wherein said method includes minimizing a total cost of Information Technology (IT) efficiency.

3. The method according to claim 1, wherein one of said at least two Information Technology (IT) performance metrics comprises efficiency, and wherein said method includes maximizing a probability of a target IT efficiency attainment, wherein said maximizing is constrained by an IT budget.

4. The method according to claim 1, further comprising:
    customizing, using a model refinement process, a predetermined client environment, wherein said predetermined client environment comprises client specific relationships based on at least one of an industry, client industry, client size, and a cost function specification.

5. The method according to claim 1, wherein said optimizing said Information Technology (IT) business decision further comprises:
    assessing an impact of different decisions on said at least one predetermined business objective, subject to said set of system constraints.

6. The method according to claim 1, wherein said set of system constraints are used to ensure that measurements related to said at least two Information Technology (IT) performance metrics are achieved within a predetermined range.

7. A system for providing formalized Information Technology (IT) business decision making, the system comprising:
    a computer processing unit, comprising:
        a first determining unit configured to determine at least one relationship between at least one Information Technology (IT) environmental element and at least two Information Technology (IT) performance metrics; and
        a second determining unit configured to:
            determine a business value based on said relationship between said at least one Information Technology (IT) environmental element and said at least two Information Technology (IT) performance metrics, and
            optimize an Information Technology (IT) business decision based on at least one predetermined business objective using said business value,
    wherein said at least one predetermined business objective is based on a set of system constraints,
    wherein said at least two Information Technology (IT) performance metrics are selected from the group consisting of efficiency, robustness of Information Technology (IT) environment, enhancement of employee productivity, and Information Technology (IT) effectiveness,
    wherein optimizing said Information Technology (IT) business decision incorporates uncertainty concerning the relationship between said at least one Information Technology (IT) environmental element and said at least two Information Technology (IT) performance metrics through a random error component,
    wherein said random error component enters the relationship as:

$$Y_j = G(x_1, \ldots, x_n) + \epsilon_j$$

wherein G represents a relationship between one of said at least two Information Technology IT performance metrics and one of said at least one Information Technology IT environmental element and x represents a decision variable, and
    wherein optimizing said Information Technology (IT) business decision comprises stochastic optimization.

8. The system according to claim 7, wherein said optimizing further comprises assessing an impact of different decisions on said at least one predetermined business objective, subject to said set of system constraints.

9. The system according to claim 7, further comprising:
    a model refinement unit configured to customize a predetermined client environment, wherein said predetermined client environment comprises client specific relationships based on at least one of an industry, client industry, client size, and a cost function specification.

10. A tangible computer-readable storage medium tangibly embodying a program of recordable, machine-readable instructions executable by a digital processing apparatus to perform a method of providing formalized Information Technology (IT) business decision making, the method comprising:
    determining a relationship between at least one Information Technology (IT) environmental element and at least two Information Technology (IT) performance metrics;
    determining a business value based on said relationship between said at least one Information Technology (IT) environmental element and said at least two Information Technology (IT) performance metrics to optimize an Information Technology (IT) business decision based on at least one predetermined business objective, wherein said at least one predetermined business objective is based on a set of system constraints, and wherein said at least two Information Technology (IT) performance metrics are selected from the group consisting of efficiency, robustness of Information Technology (IT) environment, enhancement of employee productivity, and Information Technology (IT) effectiveness; and optimizing, based on said at least one predetermined business objective, said Information Technology (IT) business decision using said business value, wherein said optimizing incorporates uncertainty concerning the relationship between said at least one Information Technology (IT) environmental element and said at least two Information Technology (IT) performance metrics through a random error component, wherein said random error component enters the relationship as:

$$Y_j = G(x_1, \ldots x_n) + \epsilon_j$$

wherein G represents a relationship between one of said at least two Information Technology IT performance metrics and one of said at least one Information Technology IT environmental element and x represents a decision variable, and wherein optimizing said Information Technology (IT) business decision comprises stochastic optimization.

* * * * *